Figure 1:
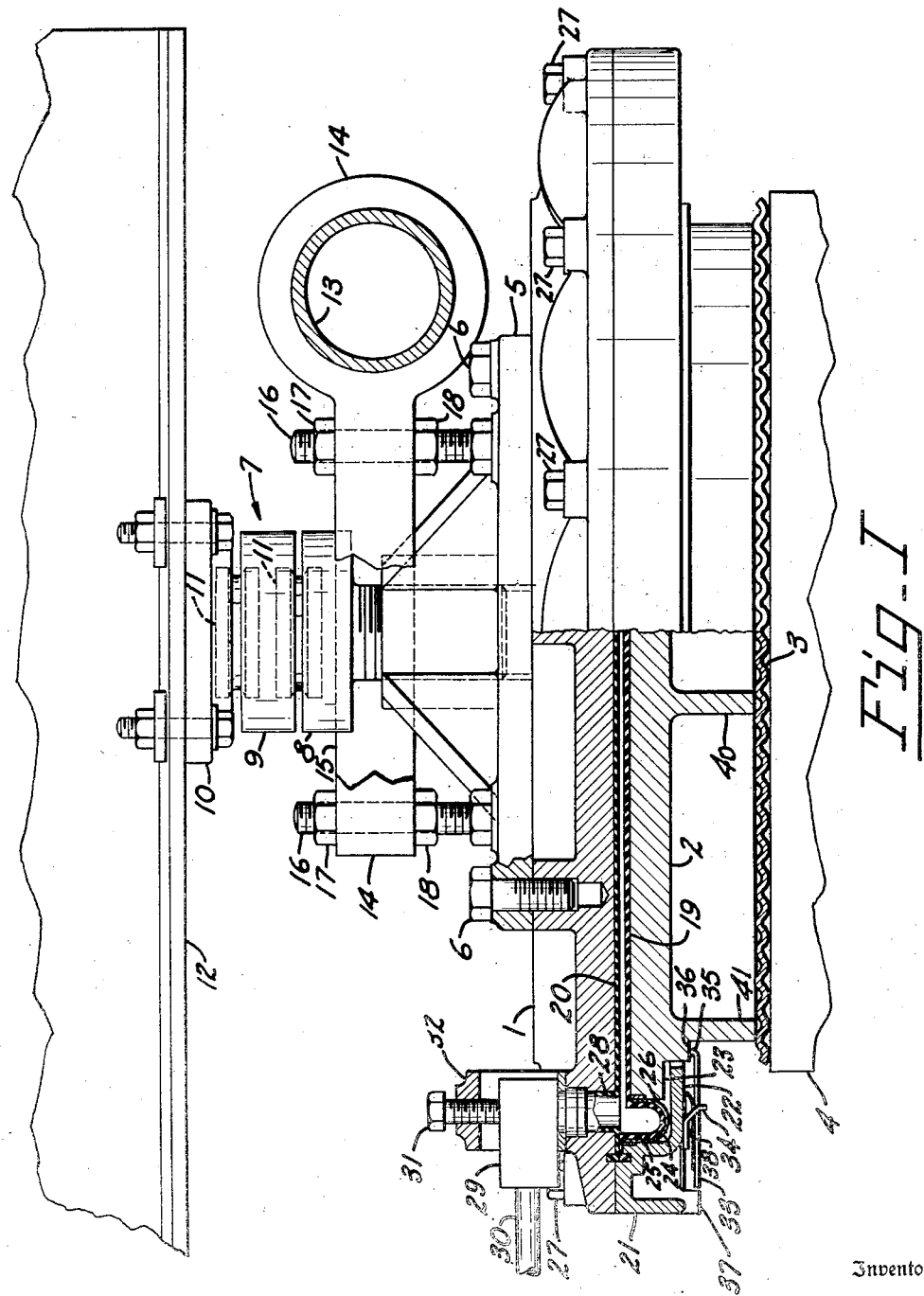

April 8, 1952     L. S. WILLIAMS     2,592,501
HYDRAULIC SCALE CAPSULE
Filed Nov. 10, 1949     2 SHEETS—SHEET 1

Inventor
Lawrence S. Williams
Marshall, Marshall & Leonard
Attorneys

April 8, 1952     L. S. WILLIAMS     2,592,501
HYDRAULIC SCALE CAPSULE
Filed Nov. 10, 1949     2 SHEETS—SHEET 2
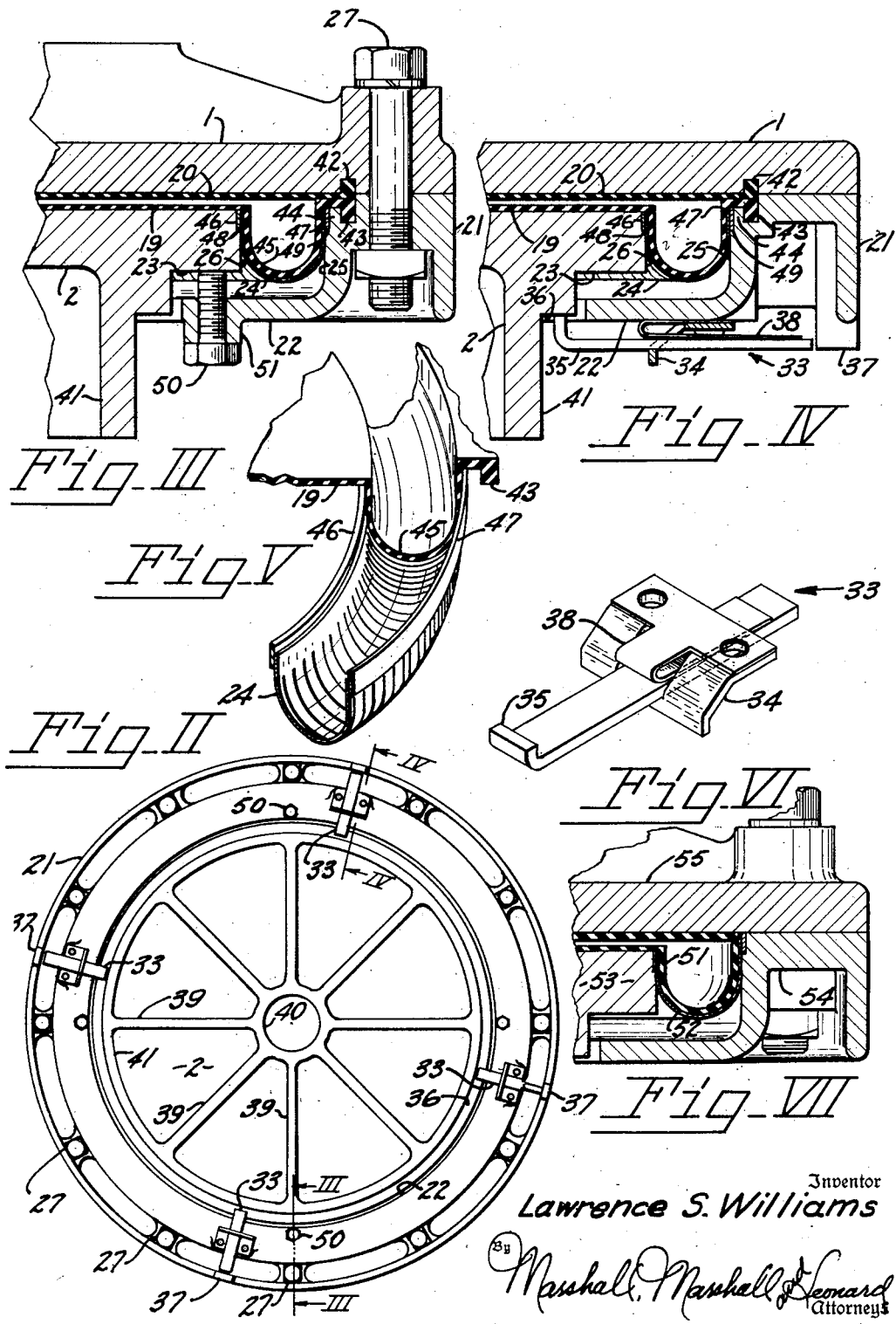
Inventor
Lawrence S. Williams

UNITED STATES PATENT OFFICE 2,592,501

HYDRAULIC SCALE CAPSULE

Lawrence S. Williams, Toledo, Ohio, assignor to Toledo Scale Company, Toledo, Ohio, a corporation of New Jersey Application November 10, 1949, Serial No. 126,531

11 Claims. (Cl. 137—157)

This invention relates to hydraulic weighing scales and in particular to improvements in the hydraulic load supporting elements commonly known as capsules.

In a hydraulic weighing scale the load receiver is supported by one or more hydraulic capsules that convert the load forces into corresponding hydraulic pressures. The hydraulic pressures are transmitted through pipes to pressure receivers, one for each capsule, that convert the hydraulic pressure into force which is balanced by suitable beam, spring or pendulum counterbalancing and indicating equipment. In order that such a scale be accurate it is necessary that the effective areas of the several capsules and pressure receiving units remain constant regardless of the magnitude of the loads being weighed and that the mechanical resistance to deformation of the capsules and pressure receiving units be reduced or eliminated so that variations in quantity of hydraulic fluid in the systems or elastic deformation of the pipes or other units cannot affect the accuracy of the force transmission through the hydraulic system. The construction of a capsule to satisfy these requirements requires painstaking care as to the materials and construction of the flexible portions of the capsule so that the capsule is both liquid tight and still mechanically free to convert all the load force to hydraulic pressure. The necessity for little or no mechanical resisting force, particularly in the capsules, may be easily understood when one considers the operation of a capsule as the quantity of fluid is varied. If the capsule is without mechanical resistance, the pressure of the hydraulic fluid within the capsule is the only force preventing the capsule from collapsing to a solid condition with its upper and lower plates in contact. If the effective area also remains constant with changes in fill then the pressure generated within the capsule is the same regardless of the quantity of hydraulic fluid. However, if the capsule has elastic resistance to deformation a portion of the hydraulic pressure is used to overcome the elastic resistance of the capsule whenever the quantity of fluid is increased so that the capsule exhibits too high a pressure for the given load. If the fill is decreased the elastic forces support a portion of the applied load and the hydraulic pressure is less than it should be.

It is furthermore highly desirable that the hydraulic capsules of a weighing scale have considerable latitude in the acceptable quantities of fill so that temperature variations in the hydraulic fluid as well as compressibility of entrapped gas and elasticity of connecting pipes cannot, by varying the quantity of fill, introduce errors or differences in pressure for given loads applied to the capsules.

The principal object of this invention is to provide an easily constructed hydraulic capsule that has very low mechanical resistance to deformation, that has a particularly constant effective area and that is capable of operating satisfactorily with widely different quantities of hydraulic fluid.

Another object of the invention is to provide a capsule in which one or more sheets of rubbery material are employed to line the interior of the capsule and retain the hydraulic fluid therein.

A still further object of the invention is to provide a simple structure for supporting the liner in the space between relatively movable parts of the capsule.

A still further object is to provide a simple structure for supporting the rubbery material which structure provides substantially constant effective area so that effective area of the capsule itself remains unchanged as the supported load varies.

An ancilliary object of the invention is to provide a simple attachment for indicating the quantity of hydraulic fluid within the capsule and the parallelism between the relatively movable portions of the capsule.

More specific objects and advantages are apparent from the following description of a preferred embodiment of the invention.

According to the invention the improved hydraulic capsule comprises first and second members that are held in spaced apart relation by hydraulic fluid contained within a bladder or between sealed together sheets of rubbery material interposed between the first and second members. One of the members includes a rim that surrounds the other of the members leaving a gap between the rim and the periphery of the other member. The bladder or rubbery sheet of material bulges into this gap and is supported therein by a plurality of sheets or strips of thin, non-stretchable, bendable material the ends of which are anchored to the rim and to the other member and the middle portions of which span, in generally semi-circular form, the gap between the rim and member to provide an annular basket or net to support the bladder or rubbery sheet. The thin, non-stretchable sheets or strips of material have lengths along the periphery of the gap sufficiently short so that each may lie in a cylindrical surface (a species of a surface having only one degree of curvature) and which may accommodate relative movement between the members by bending only without stretching of the material. If the capsule members are circular in outline the sheets or strips of material must be relatively narrow with each one occupying a very small length along the periphery of the members. If the capsule members are polygonal in form rather than circular each of the sheets or strips may have a length along the periphery substantially equal to the length of one of the sides of the polygon. For ease of machining the circular form is preferred.

The invention further contemplates that small lever-like indicators be included on one of the members with an end of each lever resting on the other of the members so that the position of each lever is an indication of the separation of the capsule members on that particular side of the capsule.

A preferred embodiment of the invention is illustrated in the accompanying drawings.

In the drawings:

Figure I is an elevation, partly in section, of the improved capsule, a portion of the pedestal on which it is mounted, and a portion of a load receiver supported by the capsule.

Figure II is a plan view of an inverted capsule to show the arrangement of the base member and the surrounding rim as well as the lever-like indicators.

Figure III is an enlarged fragmentary vertical section taken along the line III—III of Figure II to show the cooperation of the capsule members, the rubbery liner and the rim that is attached to one of the members and that surrounds the other of the members.

Figure IV is another vertical fragmentary section taken along the line IV—IV of Figure II to show one of the lever-like indicators and its cooperation with the capsule members.

Figure V is an enlarged perspective view of a fragment of the liner and the strips of flexible non-stretchable material that support the liner in the gap between the relatively movable capsule members.

Figure VI is a perspective view of one of the lever-like capsule height indicators.

Figure VII is a fragmentary sectional detail similar to Figure III showing a different form of bladder or liner construction.

These specific figures and the accompanying description are intended merely to illustrate the invention but not to limit its scope.

A hydraulic weighing scale capsule constructed according to the invention comprises a pressure plate 1 that is hydraulically supported from a base member 2 which in turn rests on a corrugated lead cushion 3 placed on top of a pier 4. The pier 4 may be formed as part of the masonry work in the pit housing the supporting mechanism of the weighing scale. The column base 5 is secured by means of a plurality of bolts 6 to transmit load uniformly over the greater portion of the pressure plate 1. A column 7 comprising three cupped members 8, 9 and 10 separated by peripherally grooved rubber inserts 11 is erected from the column base 5 and serves to support a girder 12 of a weigh bridge or load receiver that is supported in part by the illustrated capsule. The peripherally grooved rubber inserts 11 permit lateral movement of the load receiver without forcing corresponding movements of the pressure plate 1, as well as permitting the girders to bend without tipping the capsule pressure plates.

The pressure plate 1 is maintained in level condition by a framework interconnecting the pressure plates of a number of capsules. This framework comprises, among other parts, a tube 13 passing laterally adjacent a pair of capsules and having a pair of laterally extending arms 14 and 15 passing on either side of the column 7 and adjustably connected to the column base 5 by a plurality of studs 16 carrying adjusting nuts 17 and 18.

The pressure plate 1 is supported from the base 2 by hydraulic fluid contained within a bladder comprising molded rubber sheets 19 and 20. Around the periphery of the capsule the rubber sheets are held in sealing relation by a clamping rim 21 that surrounds the periphery of the base member 2 and that has an inwardly directed flange 22 underlying a radially extending ledge 23 of the base member 2. A plurality of bendable, non-stretchable strips of material 24 that are anchored to parallel opposing faces 25 and 26 of the rim 21 and the ledge 23 respectively, and that extend across the gap between these faces support the rubber liner sheet 19 in the gap while permitting relative movement between the pressure plate 1 and base 2. The rim 21, which is held in place by a plurality of bolts 27 spaced around the periphery provides a simple structure for supporting and sealing the strips and the liners.

The space between the liners 19 and 20, the space within the bladder, is in hydraulic communication with a pressure receiver. For convenience in construction the upper bladder portion or liner 20 has a neck 28 that is clamped in an opening leading through the pressure plate 1 and that is in direct communication with a disconnect valve 29 fixedly secured to the end of a pipe 30 which leads to the pressure receiver of the system. The disconnect valve 29 is clamped by a bolt 31 threaded through the top of a bridge 32 erected from the pressure plate 1 and overlying the opening from the bladder neck 28. The disconnect valve 29 may be of a separable type that automatically closes the end of the tube or pipe 30 as well as the neck of the bladder itself whenever it is released from its clamped position.

The plurality of lever-like indicators 33 each of which is supported in a yoke 34 attached to the underside of the inwardly directed flange 22 of the rim 21 has an upturned end 35 bearing against a shoulder 36 of the base 2 and has its other end in alignment with a downwardly directed finished surface 37 of the exterior portion of the rim 21. A spring 38 holds the lever 33 in position with its upwardly directed end 35 bearing against the shoulder 36. If there is too much hydraulic fluid in the system the pressure plate 1 is raised with respect to the base 2 and the end of the indicator lever 33 rises with respect to the surface 37 thus indicating an excessive fill. Likewise if the fill is insufficient the pressure plate 1 drops and the end of the lever 33 drops correspondingly with respect to the surface 37.

A plurality of these indicators (see Figure II) spaced at intervals around the periphery of the capsule allow its condition of level to be ascertained as well as its condition of fill. Its condition of level is adjusted by means of the nuts 17 and 18 threaded on the studs 16. Likewise the height of the capsule with respect to the load receiver or weigh beam girder 12 may be adjusted by screwing the threaded portion of the lower cupped column member 8 in or out of the column base 5 to thus cause each of the several capsules carrying the load receiver to support its share of the load.

The final leveling of the capsule should ordinarily be performed after the scale has been installed and loaded to its full capacity at least once. This loading to capacity is required to firmly set the base 2 on the corrugated lead cushion 3 which cushion yields in its highly stressed portions until the load is more or less uniformly distributed throughout the entire area of the base. This distribution of load is required to prevent failure of the capsule base 2 and to prevent further shifting of the capsules with applied loads. Since the lead cushion is non-resilient it permits the capsule to take its final position on the first loading to full capacity and to thereafter maintain that position without appreciable further change.

Referring now to Figure II the base 2 has a plurality of vertical radially directed ribs 39 connecting an annular central rib 40 and an outer circular rib 41. This arrangement gives the maximum strength for a minimum quantity of metal in the casting forming the base 2. Likewise the rim 21 is cast with webs and recesses to provide maximum strength with minimum weight. Furthermore, this drawing of the base shows the four lever-like indicators 33 equally spaced around the periphery of the capsule.

Referring now to Figures III and V the periphery of the upper capsule liner 20 has an upturned rim 42 around its periphery which fits a corresponding groove cut in the pressure plate 1. Likewise the rim 21 has a groove which fits and receives a turned edge 43 of the lower liner 19. An upstanding rib 44 forming a side of the groove in the rim 21 is of such a height that when the liners 19 and 20 are in position with their turned edges 42 and 43 resting in the receiving grooves and the rim 21 is bolted tightly against the pressure plate 1 the rib 44 squeezes the rubber liners to form a pressure tight seal. For convenience in assembly the turned edges 42 and 43 of the liners are made narrower and deeper than the corresponding grooves so that they may be easily slipped into place and then compressed to fill the grooves as the rim 21 is bolted into place. This construction makes it easy to assemble a capsule and to disassemble one for repair because none of the parts need be cemented or otherwise irremovably joined together in the assembly of the structure.

Referring to Figure V in particular, the supporting sheets or narrow strips 24 that support against expansion in the bulging hemitoroidal bead 45 of the lower liner 19 are anchored, as by welding, to a pair of bands 46 and 47. For convenience in construction the strips 24 are formed by laterally slitting a long strip of material with the slits extending from one side of the long strip to the margin of the other side but not completely severing the strips from each other. The unsevered marginal area of the long strip is welded or otherwise secured throughout its length to the band 46. The strips 24 are then held in a mold or jig while their ends are welded to the other band 47. Because of the greater length of the band 47 the strips 24 are spaced apart slightly where they are attached to the band 47. This spacing apart however is not sufficient to allow the rubber liner to protrude through the gaps between the strips.

It is pointed out that the bands 46 and 47 are located outside the U-shaped form of the flexible strips 24. The edges of these bands are made as nearly square as practical so that when they are assembled in the capsule the band 46 may fit in a rabbet 48 in the periphery of the base 2 with its square edge supported against the shoulder of the rabbet. Likewise, the other band 47 fits into a rabbet 49 cut into the surface 25 of the rim 21. The square edges of the bands and the sharp shoulders of the rabbets provide adequate support and anchorage for the bands and the bendable, non-stretchable strips 24 so that they may withstand the forces hydraulically exerted against the capsule liner 19.

Figures IV and VI illustrate in considerable detail the lever-like indicators 33 that are mounted from the yokes 34 with their upturned ends 35 bearing against the shoulders 36 of the base 2. As may be seen in Figure IV the lower surface of the end of the lever 33 is flush with the lower surface 37 of the rim 21. This is the normal adjusted position for the capsule.

In initial assembly a more exact fill is obtained through the use of stop screws 50 (Figure III) which are threaded through the inwardly directed flange 22 and contact the lower surface of the ledge of the base 2. Each of the screws 50 is of predetermined length and is threaded through a machined boss 51 of the flange 22. Their ends, resting against the machined surface of the ledge of the base 2, provide very definite positioning of the pressure plate 1 with respect to the base 2. The capsule is filled to the limit permitted by the screws 50 and the lever-like indicators 33 are adjusted to the position shown in Figure IV. The stop screws 50 are removed during installation of the capsule in a scale to allow free movement of the capsule parts.

In normal operation of this hydraulic scale capsule the non-stretchable flexible strips 24 serving to support the bead 45 of the capsule liner 19 take a nearly semi-circular form between end portions which lie tangent to and against the surfaces 25 and 26 of the rim 21 and the base 2 respectively. If the pressure plate 1 and rim 21 move upwardly or downwardly with respect to the base 2 the strips 24 maintain their generally semi-circular form as they roll or unroll against the supporting surfaces.

The effective area of a capsule constructed according to the invention consists of the area of the base 2 plus half of the projected area of the gap between the base 2 and the rim 21. The gap between the members must therefore be very accurately controlled so that the pressure exerted on the projected area of the gap and which is counteracted by tension in the strips 24 is properly divided between the rim 21 and the base 2. In the ideal capsule the strips 24 are non-stretchable membranes, i. e., they have no resistance to bending although they are non-stretchable. With membranes it may be shown mathematically that, at a distance from the center of the capsule equal to the radius of the effective area of the capsule, the strips are horizontal (their end portions resting against the rim 21 and capsule base 2 are vertical). In actual construction bendable non-stretchable thin metal strips are the closest possible approach to a true membrane and it is necessary that they approximate as closely as possible the shape assumed by a true membrane.

Furthermore to maintain a precisely predictable effective area it is necessary that the diameter of the base 2 and of the rim 21 be precisely determined and that the area of the gap over which the hydraulic pressure acts be just as precisely determined. For this reason the strips 24 are arranged to be supported directly in contact with the accurately machined surfaces of the rim and base rather than being supported on intermediate constructional members which in turn are supported against the rim and base. This elimination of any members having appreciable tolerance in dimension serves to reduce the random errors in effective area between supposedly identical capsules. The rubber or rubber-like material forming the capsule liner 19 need not be held to precisely constant dimensions because it constitutes in effect a part of the hydraulic fluid and transmits the hydraulic force to the strips 24 without in itself affecting the force transmission.

The capsule liners 19 and 20 together constitute a bladder serving to hydraulically seal the space between the base 2 and the pressure plate 1. In the preferred embodiment shown in Figures I to V inclusive the bladder is made in two parts that are held sealed together by pressure exerted against the rims of the liner elements 19 and 20. This is the preferred type of construction because of the ease with which the capsule may be assembled and later disassembled for repair if such is necessary. However, it is also practical, from a constructional point of view, to make the capsule liner in the form of a sealed bladder 51 (Figure VII) which bladder is supported by strips 52 the ends of which are anchored to a base 53 and a rim 54 of a pressure plate 55. The only difference in construction between this second example and the first example is the construction of the liner as a single bag or bladder-like element that is made liquid tight before installation in the capsule.

In the first example the liners 19 and 20, which together constitute the bladder, have their edges held sealed by a pressure tight joint that permits complete disassembly should such be found desirable. Another advantage of the first type of construction is the ease with which the rubber sheets forming the liners may be molded.

In either example the advantages of the invention are clearly obtained because in each example the bladder provides a liquid tight envelope which in itself contributes nothing to the weighing of load and which may be, by the use of accurately machined bases and rims with interconnecting flexible strips, held to a precisely determined shape thus securing extremely accurate proportionality between the loads applied to the pressure plate and the hydraulic pressures developed in the capsule as a result of those loads.

Various modifications may be made in the specific details of construction without departing from the spirit and scope of the invention or losing the advantages obtained by employing a bladder or separable rubber-like liner in a capsule for a hydraulic weighing scale.

I claim:

1. In a hydraulic capsule forming part of a hydraulic force transmitting system for a weighing scale, in combination, a first member, a second member, a rim on the first member that surrounds the periphery of the second member, a plurality of laterally juxtaposed bendable, non-stretchable strips that arch across the gap between the rim and the periphery of the second member and that are anchored to the rim and to the second member, an impervious bladder enclosed between the members and supported by the members and the plurality of juxtaposed strips, and a fluid coupling in communication with the interior of the bladder.

2. In a hydraulic capsule forming part of a hydraulic force transmitting system for a weighing scale, in combination, a first member, a second member, a rim on the first member that surrounds the periphery of the second member, opposing faces of the rim and second member being spaced apart and generally perpendicular to load receiving surfaces of the members, a plurality of laterally juxtaposed bendable non-stretchable strips that are anchored to the rim and to the second member and that arch between the opposing faces of the rim and member with portions resting against the faces, an impervious bladder enclosed between the load receiving surfaces of the first and second members and supported by the members and the plurality of strips, and a fluid coupling in communication with the interior of the bladder.

3. In a hydraulic capsule forming part of a hydraulic force transmitting system for a weighing scale, in combination, a first member, a second member, a rim on the first member that surrounds the periphery of the second member, the opposing faces of the rim and second member being right cylindrical and spaced apart, a plurality of closely spaced strips that are anchored to the rim and to the second member and that arch between the rim and member with the ends of the arched portions resting against the cylindrical faces, and an impervious bladder having a fitting for fluid communication with its interior enclosed between said members and supported against expansion by the members and strips.

4. In a hydraulic capsule forming part of a hydraulic force transmitting system for a weighing scale, in combination, a first member, a second member, a rim on the first member arranged to surround the periphery of the second member leaving a gap therebetween, an impervious bladder of stretchable material having a fitting for fluid communication with its interior interposed between the first and second member and extending into the gap between the rim and the periphery of the second member, and a plurality of closely spaced bladder retaining members that are attached to the rim and to the second member with the attached portions of the retaining members parallel to each other and the intermediate portion arched across the gap, said retaining members being resilient and non-stretchable to support the bladder without mechanically restricting relative movement between the first and second members.

5. In a hydraulic capsule forming part of a hydraulic force transmitting system for a weighing scale, in combination, a first member, a second member, a rim on the first member arranged to surround the periphery of the second member leaving a gap between the rim and the second member, an impervious bladder interposed between the first and second members, a fluid coupling in communication with the interior of the bladder, and a plurality of sheets of bendable non-stretchable material that are laterally juxtaposed and that are anchored to the rim and to the second member with the sheets arching across the gap to form a support for the bladder.

6. In a hydraulic capsule forming part of a hydraulic force transmitting system for a weighing scale, in combination, a first member, a second member having a generally circular periphery, a rim on the first member that surrounds the generally circular periphery of the second member, spaced apart parallel opposed surface on the rim and the second member, each of the surfaces having a shallow step, an impervious bladder interposed between said members and having a hemitoroidal section extending into the gap between the rim and the second member, a fluid coupling in communication with the interior of the bladder, and a support for the hemitoroidal section comprising a plurality of closely spaced strips and a pair of bands, the strips being secured to the bands and the bands fitting the stepped surfaces of the rim and second member.

7. In a hydraulic capsule forming part of a hydraulic force transmitting system for a weighing scale, in combination, a first member, a second member having a generally circular periphery, a rim on the first member that surrounds the second member, a rabbet on each of the opposed surfaces of the rim and second member, a circular band fitted into each rabbet, a plurality of closely spaced strips of bendable non-stretchable material that have their ends secured to the bands and that lie in part against the opposed surfaces of the rim and second member, said strips arching across the gap between the rim and the second member, an impervious bladder interposed between the first and second members and supported in the gap between the members by said plurality of strips, and a fluid coupling in communication with the interior of the bladder.

8. In a hydraulic capsule forming part of a hydraulic force transmitting system for a weighing scale, in combination, a first member, a second member having a generally circular periphery, a rim on the first member that surrounds the second member, a rabbet on each of the opposed surfaces of the rim and second member, a first band that fits one of the rabbets, a sheet of resilient bendable non-stretchable material that along one edge is attached to the band, said sheet having a plurality of cuts perpendicular to the edge secured to the band to divide it into a plurality of connected strips, a second band that fits the other rabbet, said strips being individually attached to the second band, and an impervious bladder that includes a fluid coupling in communication with the interior of the bladder and that is interposed between the first and second member and supported in the gap between the members by the plurality of strips attached to the bands fitted in the rabbets.

9. In a hydraulic capsule forming part of a hydraulic force transmitting system for a weighing scale, in combination, a first member, a second member having a generally circular periphery, a rim on the first member that surrounds the periphery of the second member, said rim and said second member having opposed parallel surfaces, a plurality of strips anchored to the rim and the second member and arching therebetween, a bladder having a fluid coupling in communication with its interior interposed between the members and supported in the gap between the members by said plurality of strips, and an inwardly directed flange on the rim that projects over the margin of the second member to prevent separation of the members.

10. In a hydraulic capsule forming part of a hydraulic force transmitting system for a weighing scale, in combination, a first member, a second member, a rim on the first member that surrounds the periphery of the second member, means for retaining hydraulic fluid between said members, a fluid coupling in communication with the interior of said means, and an indicator for indicating the axial spacing between said members, said indicator comprising a lever that is fulcrumed on one of said members, that has another portion resiliently urged against the other member and that has its end in alignment with a reference point of one of the members when the members are correctly spaced.

11. In a hydraulic capsule forming part of a hydraulic force transmitting system of a weighing scale, in combination, a first member, a second member, a rim on the first member that surrounds the second member, means for retaining hydraulic fluid between the members, and an indicator for indicating the extent of axial separation of the members, the indicator comprising a lever that is fulcrumed on the rim with one end resiliently urged against the second member and the other end in alignment with a reference point on the rim when the members are correctly spaced.

LAWRENCE S. WILLIAMS.

REFERENCES CITED

The following references are of record in the file of this patent:

UNITED STATES PATENTS

| Number | Name | Date |
|---|---|---|
| 325,926 | Garsed | Sept. 8, 1883 |
| 2,076,071 | De Bolt | Apr. 6, 1937 |